Nov. 23, 1965  B. H. WILKINSON  3,219,568
ELECTROLYTIC HOLE FORMING APPARATUS
Filed June 2, 1961
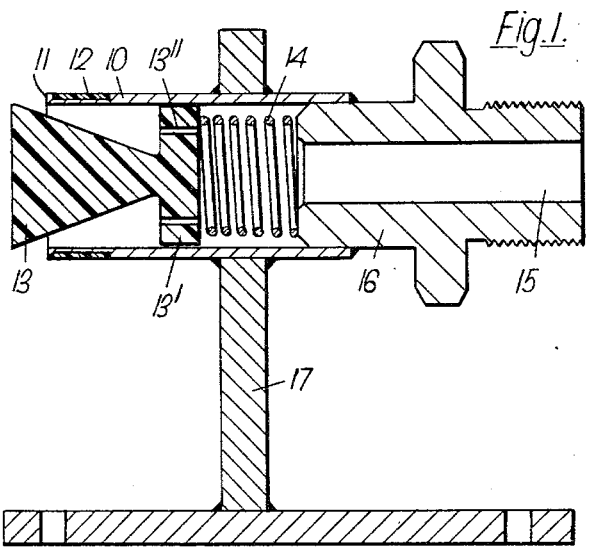
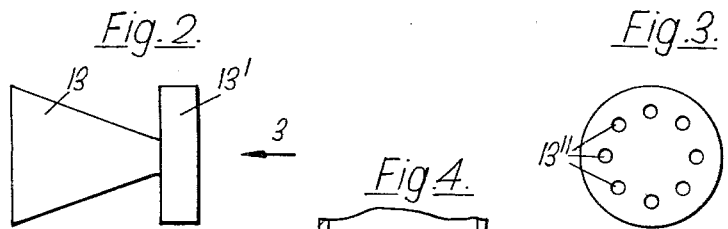
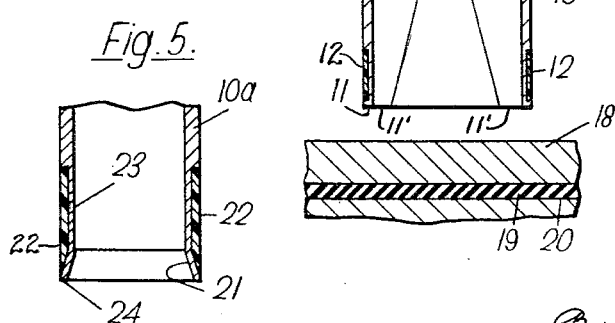
Inventor
Bernard Hall Wilkinson
By
Cushman, Darby & Cushman
Attorneys

United States Patent Office 3,219,568
Patented Nov. 23, 1965

3,219,568
ELECTROLYTIC HOLE FORMING APPARATUS
Bernard Hall Wilkinson, Glasgow, Lanark, Scotland, assignor to Rolls-Royce Limited, Derby, England, a company of Great Britain
Filed June 2, 1961, Ser. No. 114,338
Claims priority, application Great Britain, June 3, 1960, 19,829/60
6 Claims. (Cl. 204—224)

This invention relates to a method and apparatus for forming a hole in a workpiece.

According to the present invention there is provided a method of forming a hole in a workpiece which comprises disposing an electrode close to the workpiece, pumping an high rate of flow of electrolyte between the workpiece and the electrode, applying direct current between the workpiece and the electrode so that the workpiece is made an anode and the electrode a cathode, and causing the workpiece and the electrode to move relatively towards each other so that the electrode enters the workpiece to form the said hole therein.

The term "high rate of flow" as used in this specification is intended to indicate a rate of flow such that salts will not become deposited on the electrode.

Preferably the electrolyte is directed onto the workpiece in an annular area whose external circumference is substantially the same as and aligned with that of the electrode.

The electrode is preferably always maintained as close to the workpiece as is consistent with the avoidance of a spark therebetween.

The direct current employed preferably has a voltage not exceeding 48 volts and may desirably be of the order of 12 volts.

The current density on the workpiece is preferably in the range of 50–1000 amperes per square inch.

The workpiece is preferably placed on a resilient base of non-conducting material (e.g. rubber) during hole formation, the resilient base being supported on a firm metal base.

The method of the present invention is particularly applicable to the formation of regularly or irregularly shaped holes in alloys sold under the registered trademark "Nimonic," such alloys being very difficult alloys to machine.

The invention also comprises apparatus for forming a hole in a workpiece comprising a tubular electrode adapted to form a cathode in a direct current circuit, a plug of non-conductive material which is slidably mounted within the electrode and which is spaced therefrom by an annular space, resilient means for urging one end of the plug outwardly of the adjacent end of the electrode, the said end of the plug being movable inwardly of the said end of the electrode against the action of said resilient means and conduit means through which said annular space may be supplied with a high rate of flow of electrolyte.

The electrode may be made of any conducting material e.g. copper, which is not corroded by the electrolyte, and the external surface of the electrode adjacent the said end thereof may be coated with non-conductive material to prevent electrolytic action between the outer surface of the electrode and the workpiece as the electrode progresses into the workpiece.

The said end of the electrode may be splayed outwardly so that only the extreme periphery acts as a working electrode.

The plug is preferably shaped to restrict the flow of electrolyte through the electrode and to build up the pressure of the electrolyte at the said end of the electrode. Thus the plug may be frusto-conical, the larger end of the plug being situated at the said end of the electrode.

The invention is illustrated, merely by way of example in the accompanying drawings in which:

FIGURE 1 is a section through an apparatus according to the present invention,

FIGURE 2 is a side elevation of a plug forming part of the apparatus of FIGURE 1, FIGURE 3 is a view of the plug shown in FIGURE 2, taken in the direction of arrow 3, FIGURE 4 is a part-sectional elevation of the lower end of the apparatus of FIGURE 1 in relation to a workpiece and, FIGURE 5 shows an alternative form of the apparatus of FIGURE 1.

Referring to the drawings, an electrode assembly for making round holes is shown in FIGURE 1. The electrode consists of a cylindrical metal tube 10 having an end portion 11 which actually acts as the working electrode. A portion of the external surface of the tube 10 near the end portion 11 is coated with a non-conductive material 12 such as a thermo-plastic resin.

Within the tube 10 is a non-conductive frusto-conical plug 13 having a flanged portion 13′ at its smaller end, the plug 13 being biased by a spring 14 so that it tends to move towards the open end of the tube 10. The plug 13 has a number of axial flow, angularly spaced apart holes 13″ drilled in its flanged portion 13′ to allow the electrolyte to flow through it. The electrolyte is supplied via a bore 15 in an end member 16 which is brazed to the tube 10. The tube 10 is supported in a frame 17 which can be bolted to a vertical movable rod.

In operation, electrolyte is supplied through the bore 15 at very high pressure, and the larger end of the plug 13 restricts the flow of electrolyte through the open end of the tube 10 and builds up the working pressure of the electrolyte.

The electrolyte may be an aqueous solution of sodium chloride as in my application, Serial No. 114,357, filed even date herewith, and is supplied at a sufficient rate of flow to prevent formation of salts on the electrode. The actual rate of flow used is much higher than this minimum value. In one particular experiment, the pressure of the electrolyte supplied to the bore 15 was of the order of 100/150 lb. per square inch, and the electrolyte flowed at a rate of 10 gallons per minute through the tube 10, which had a circumference of 4 inches, i.e., at the rate of 2½ gallons per minute per inch of hole circumference.

To make a hole in a sheet of hard metal, such as a Nimonic alloy, the sheet 18 (FIGURE 4) is placed on a rubber backing member 19 in turn placed on a hard surface 20.

The electrode is placed in position above the sheet 18. The plug 13 is then spring-biased downwardly so that when the end portion 11 of the tube 10 is within a few thousandths of an inch of the sheet 18 the end face of the plug 13 actually touches the sheet but a restriction is maintained between the larger end of the plug 13 and the open end of the tube 10 through which electrolyte flows at high pressure. The external diameter of the plug is always less than the minimum internal diameter of the tube 10 and therefore, in operation, the tube 10 and plug 13 form an annular passage or gap 11′ through which the electrolyte flows. This passage is very small, as discussed hereinafter, but its size along with the slope of the plug 13 has been exaggerated in FIG. 4 to emphasize that the maximum external diameter of the plug 13 is less than the minimum internal diameter of the tube 10 and therefore the plug will retract into the tube 10 as the hole is formed. 12 volts D.C. is maintained between the tube 10 and the workpiece 18 and the gap between the portion 11 of the tube 10 and the workpiece is kept so small that a very high current density of the order of 100 amps per square inch can be passed. As in my above mentioned application, the workpiece is made the anode by connecting its lead to the positive side of the D.C. source, while tube 10 becomes the cathode due to its connection to the negative side thereof. As electrolysis proceeds, tube 10 is moved towards sheet 18 and enters the annular recess which is progressively formed in the sheet, the plug 13 remaining in contact with the surface of the sheet so that the position it occupies relative to the tube becomes increasingly rearward of the open end 11 of the tube. When the said recess extends throughout the thickness of sheet 18, the circular hole will have been formed in the sheet.

To prevent the edges of the hole being deformed by electrolysis between the outer surfaces of the tube 10 and the wall of the hole as it is formed, the tube 10 is insulated by the non-conductive material 12.

The rubber backing member 19 ensures that if the electrode is slightly out of vertical alignment the hole will still be cut completely through the sheet of metal. Also, when the hole has been completely formed the rubber backing member 19 seals off the open end of the tube 10 causing a build-up of electrolyte pressure within the tube 10, thus indicating that the hole is completely formed.

An alternative form of electrode assembly is shown in FIGURE 5. This employs a cylindrical tube 10a which has an open end portion 23 of reduced external diameter, the lower section 21 (as seen in FIGURE 5) of this end portion 23 being flared outwardly such that its largest external diameter is substantially the same as the main section of the tube 10a. It will thus be seen that only the extreme edge 24 of the lower section 21 will act as the working surface of the electrode, since the end portion 23 of the tube will be spaced too far from the workpiece. This again prevents spread of the gap formed by electrolysis between the external surface of the tube 10a and the sides of the hole being formed.

The electrode 10a may also be coated with a non-conductive material 22 (FIGURE 5) on the external surface of the end portion 23.

This will further prevent spread of the hole being formed.

The invention has particular application to metals which are difficult to machine by conventional methods. For example, a Nimonic alloy containing a high percentage of cobalt such as Nimonic 115 can be quickly machined by using this invention, to a surface finish of 20 micro-inches or better.

I claim:

1. A cathode electrode for forming a hole electrolytically in a metallic anode workpiece, comprising a metal tube having an open forward annular working rim, and an insulating plug which is axially slidably mounted concentrically in the tube, said plug having a forward portion of smaller external cross section than the internal cross section of the tube so that said portion defines with the tube an annular passage whose forward end is open, said portion having a plane forward end face which is movable rearwardly of said rim within the tube and said passage communicating with electrolyte conduit means so that a flow of electrolyte can pass through the electrode via said conduit means and said passage.

2. An electrode as claimed in claim 1 including resilient means urging said plug forwardly along the tube.

3. An electrode as claimed in claim 1 in which the internal surface of said tube immediately adjacent said rim is splayed outwardly.

4. An electrode as calimed in claim 1 in which said plug has a flange which slidably engages the internal surface of the tube to support the plug concentrically and slidably in the tube, said flange having duct means extending therethrough which communicate with said passage and form part of said electrolyte conduit means.

5. A cathode electrode for forming a hole electrolytically in a metallic anode workpiece, comprising a metal tube having an open forward annular working rim, and an insulating plug which is axially slidably mounted concentrically in the tube, said plug having a forward portion which tapers rearwardly and whose maximum external cross section is smaller than the internal cross section of the tube so that said portion defines with the tube an annular passage whose forward end is open, said portion having a plane forward end face which is movable rearwardly of said rim within the tube, and said passage communicating with electrolyte conduit means so that a flow of electrolyte can pass through the electrode via said conduit means and said passage.

6. A cathode electrode for forming a hole electrolytically in a metallic anode workpiece, comprising a metal tube having an open forward annular working rim and conduit means for connecting the tube to an electrolyte supply, the tube being closed apart from said rim and said conduit means, and an insulating plug which is axially slidably mounted concentrically in the tube, the plug having a forward portion of smaller external cross section than the internal cross section of the tube so that said portion defines with the tube an annular passage whose forward end is open, said portion having a plane forward end face which is movable rearwardly of said rim within the tube, and said passage communicating with said conduit means.

References Cited by the Examiner

UNITED STATES PATENTS

| 2,457,234 | 12/1948 | Herbert et al. | 204—195 |
| 2,583,233 | 4/1949 | Russell | 299—59 |
| 2,684,939 | 7/1954 | Geese | 204—224 |
| 2,844,531 | 7/1958 | Prince | 204—143 |
| 3,002,907 | 10/1961 | Williams | 204—224 |
| 3,019,178 | 1/1962 | Williams | 204—224 |
| 3,041,265 | 6/1962 | Williams | 204—224 |
| 3,058,895 | 10/1962 | Williams | 204—143 |
| 3,120,482 | 2/1964 | Williams | 204—224 |

FOREIGN PATENTS

| 370,467 | 3/1932 | Great Britain. |
| 335,003 | 9/1930 | Great Britain. |

OTHER REFERENCES

Bleiweis et al., "Electrochemical Removal of Broken Tools," Metals and Alloys, November 1943, pages 1075–1080.

JOHN H. MACK, *Primary Examiner.*